United States Patent Office 3,192,232
Patented June 29, 1965

3,192,232
WARFARIN ALKALI METAL DERIVATIVE
PROCESS
Collin H. Schroeder and Karl Paul Link, Madison, Wis., assignors to Wisconsin Alumni Research Foundation, Madison, Wis., a corporation of Wisconsin
No Drawing. Filed Feb. 21, 1961, Ser. No. 90,613
5 Claims. (Cl. 260—343.2)

The present application is a continuation-in-part of our application Serial No. 795,356, filed February 25, 1959, now abandoned.

The present invention relates to warfarin known chemically as 3-(α-acetonylbenzyl)-4-hydroxycoumarin and more specifically to improvements in the art and science of making and purifying warfarin and alkali metal derivatives of warfarin, e.g. warfarin sodium, warfarin potassium and the like.

The alkali metal derivatives of warfarin (sometimes referred to as salts of warfarin) can be prepared by reacting an aqueous slurry of warfarin containing excess warfarin with an aqueous solution of alkali metal hydroxide and then removing the excess warfarin as described in Link Patent 2,777,859. The alkali metal derivatives of warfarin of the present invention are prepared by a modification of the patented Link process, supra, described below.

The use of the sodium derivative of the widely used rodenticide warfarin (see Link, K. P. and Ross, Ward, Pest Control, August 1956) as an anticoagulant in the clinical field is now well known. See the New York Heart Association (New York Academy of Medicine) Lecture entitled "The Discovery of Dicumarol and Its Sequels," of February 25, 1958, by Karl Paul Link. Circulation, 19, No. 1, pages 97–107 (1959). See also Pollock, B. E., J.A.M.A. 161, 404 (1956) and Shapiro et al., J.A.M.A. 165, 1377 (1957) and the other 16 citations in "Warfarin Sodium in Human Medicine," prepared for Poison Control Centers, by Wisconsin Alumni Research Foundation (1958). Indeed, warfarin sodium has been called the "more nearly ideal anticoagulant drug now available." Nicholson, J. H., New England Jl. of Medicine, 255, 491 (1956). See also Baer, S., J.A.M.A. 167, 704, June 1958. The potassium derivative of warfarin, warfarin potassium, has also been used clinically.

In early research investigations in this field it was noted that warfarin sodium when in aqueous solution had a slight yellow color or took on a yellow color on standing which was followed by the formation of precipitates. Aside from the fact that ampules containing off color solutions with precipitates were unacceptable for use intravenously in the clinical field, attempts were made to solve this problem as warfarin medicaments used in this field should be free or substantially free from non-warfarin products and this is particularly true where, as here, the products were not completely determined. During this investigation it was found that aqueous solutions of warfarin sodium containing free alkali were yellow in color and formed precipitates relatively rapidly and that warfarin sodium (or solutions of warfarin sodium) should therefore be free from free alkali. This problem was solved by the use of excess warfarin resulting in the preparation of a substantially alkali-free warfarin sodium and warfarin potassium in accordance with the process of Link Patent 2,777,859. It was also found that the color developed in the presence of free alkali (see Alkaline Color Value referred to below) is due in a small measure to the warfarin salt but in a large measure to by-products including phenolic products, one of which has been isolated and identified as 3-(o-hydroxyphenyl)-5-phenyl-2-cyclohexene-1-one from warfarin sodium preparations. These undesirable color producing compounds can be materially reduced by treating an aqueous solution of the warfarin salt prepared with excess warfarin with activated charcoal as described in Link Patent 2,777,859.

The products prepared as described above have been used successfully in the clinic but the search has continued for means of preparing improved products, i.e. products with still lower Alkaline Color Values. This value can be obtained for warfarin sodium by dissolving 1.25 g. of warfarin sodium in 10 ml. of 5% aqueous NaOH and within 15 minutes determining the optical density in a one cm. cuvette at 385 mμ using 5% aqueous NaOH as the blank. A product with the lowest possible Alkaline Color Value is desired, as the amount of non-warfarin material responsible for color change and the formation of precipitates, decreases as the Color Value decreases.

In the continued research in this field, modified procedures of preparing warfarin and the sodium and potassium derivatives or salts of warfarin, along with various procedures for purifying warfarin and the derivatives of warfarin, were investigated. During this period it was discovered that the amount of non-warfarin material present in the recovered alkali metal derivative of warfarin could be reduced or readily kept at a minimum by carrying out the reaction between the alkali metal hydroxide and excess warfarin in an aqueous reaction mixture containing a small amount of acetone or like acting water miscible solvent in which free acidic warfarin is slightly soluble. The modus operandi is not fully known but it appears that the acetone facilitates the solution of free acidic warfarin which is soluble in acetone but relatively insoluble in water, and, as a result of this, that the salts of the less acidic undesirable phenolic side products are removed by equilibration with the acidic warfarin, e.g. the free warfarin is converted to warfarin sodium (readily water soluble) and the sodium salts of the phenolic compounds are converted to free acidic phenolic compounds (essentially water insoluble) which precipitate and are removed or separated from the warfarin sodium, e.g. filtered off, with the remaining excess warfarin. The 10 percent by volume of acetone or equivalent water miscible solvent is not critical although for best results the amount of solvent used should not vary much (e.g. ±2%) either way.

In the process of the present invention aqueous alkali metal hydroxide, i.e. sodium hydroxide or potassium hydroxide, is added to an aqueous-acetone slurry containing excess warfarin. The mixture is then treated with activated carbon and filtered to remove insoluble material including carbon and excess warfarin along with the insoluble non-warfarin material. The resulting solution containing the alkali metal (sodium or potassium) derivative of warfarin (a) can be acidified to recover (precipitate) purified warfarin or (b) can be used as such to recover warfarin sodium or warfarin potassium in amorphous form in accordance with Link Patent 2,777,859. In either case, regardless of whether the process is used to prepare purified free warfarin or to prepare the sodium or potassium derivatives of warfarin, the critical step in the process involves the addition of the appropriate alkali metal hydroxide to an aqueous-acetone slurry containing excess warfarin.

The following examples will serve to illustrate the invention.

EXAMPLE I

*Preparation of warfarin*

(1) Distilled water is the solvent of choice.

(2) Reactant concentrations per 1000 ml.: 4-hydroxycoumarin (M.P. 210–212° C. or higher) 102 g. (this includes a 5% excess); benzalacetone (congealing point about 37° C.) 88 g.; and triethylamine (catalyst) 6 ml. The excess 4-hydroxycoumarin is to drive the reaction to the right, to give a better yield of warfarin and to eliminate a serious benzalacetone contaminative problem.

(3) Reaction time: The heterogeneous reaction mixture is refluxed for 4–5 hours with rapid mechanical stirring. Solid warfarin separates after about one hour of refluxing.

(4) Cool the reaction mixture and add 28 g. A.R. sodium hydroxide dissolved in 100 ml. distilled water (all the warfarin should be in solution as its sodium salt). Extract the alkaline water solution with 500 ml. of methylene dichloride or ethylene dichloride, using only mild mechanical agitation. Any suitable water immiscible hydrocarbon or halogenated hydrocarbon can be used in this extraction.

(5) The alkaline layer is separated and acidified by pouring slowly into 2–3 liters of water containing about 36 g. of concentrated sulfuric acid (slight excess). The crude warfarin (usually colorless) is removed via a basket centrifuge and washed several times with water. The yield of crude warfarin is over 92% (dried).

In the above process, in addition to the use of excess 4-hydroxycoumarin, the use of water as the solvent and a minute amount of catalyst, about $0.1 \pm 0.01$ mole of triethylamine per mole of 4-hydroxycoumarin, plus good quality starting materials, coupled with rapid and vigorous stirring of the reaction mixture, provides a high yield of finely divided solid warfarin which is relatively easy to work up for purification. In somewhat similar prior art processes, the warfarin is usually obtained as an oily or gummy product which is difficult to purify.

EXAMPLE II

Purification of warfarin

Crude warfarin (175 g., dry), prepared as described above, is slurried with 600 ml. of water containing 60 ml. of A.R. acetone (alcohol free). Concentrated aqueous sodium hydroxide solution (about 23 g. A.R. sodium hydroxide in 100 ml. water) is added (an amount sufficient to dissolve all but about 5% of the warfarin) with rapid mechanical stirring. An excess of alkali must be avoided. It is also important that about 5% free warfarin be available for equilibration with the sodium salts of phenolic side products. The mixture is stirred for about one hour and the excess warfarin is removed by filtration. About 20 g. of activated carbon (Darco KB) is then added and the mixture is stirred mechanically for an addition 15–30 minutes. The mixture is filtered by suction through whatman #50 filter paper. The resulting aqueous filtrate is acidfied by slowing pouring the filtrate into 2–3 liters of water containing about 36 g. of concentrated sulfuric acid with rapid mechanical stirring. The warfarin is removed by the use of a basket centrifuge and is washed several times with water.

The washed warfarin (directly from basket) is crystallized from A.R. acetone (alcohol free) by dissolving it in a minimum amount of refluxing A.R. acetone. The solution is slowly cooled to room temperature and held at 4° C. for 10–15 hours. The warfarin crystals are removed in a basket centrifuge. A second crop is obtained by adding water to the refluxing filtrate to incipient turbidity, cooling and collecting the crystals. The second crops from several preparations can be saved and recrystallized collectively from A.R. acetone.

EXAMPLE III

Preparation of warfarin sodium

A warfarin-water slurry is first prepared by mixing about 250 ml. aqueous acetone solution (about 10% acetone by volume) with 110 g. warfarin (⅓ mole+7 g. excess). A solution of sodium hydroxide is next prepared by dissolving 13.3 g. of A.R. sodium hydroxide (⅓ mole) in about 50 ml. of distilled water. The solution of sodium hydroxide at room temperature, is then added slowly with vigorous agitation to the aqueous-acetone warfarin slurry. The slurry is mechanically stirred for about one hour and the excess warfarin not in solution is removed by filtration. The aqueous-acetone warfarin sodium solution thus prepared is stirred for a period of 15–30 minutes with 10 g. of highly activated decolorizing charcoal (Darco KB). The carbon is removed by suction filtration, .ie. through whatman No. 50 filter paper. The warfarin sodium can be isolated in the amorphous form by vacuum concentration of the solution and drying as specified in the Link Patent 2,777,859 or by spray or drum drying. It usually contains about 60–75 parts of non-warfarin material per million parts of warfarin sodium. The warfarin sodium can be further purified by forming the crystalline isopropyl alcohol complex as described in our copending application Serial No. 90,645, filed February 21, 1961, now having matured to U.S. 3,077,481.

EXAMPLE IV

Preparation of warfarin potassium

This example follows the procedure of Example III using the aqueous acetone with excess warfarin, except that 18.6 g. of A.R. potassium hydroxide (⅓ mole) is used in place of the sodium hydroxide used in Example III. In place of recovering the amorphous salt as in Example III, the aqueous warfarin potassium solution after filtering off the carbon can be acidified to recover purified warfarin as in Example II. The aqueous-acetone slurry containing excess warfarin can be used to advantage in the preparation of both warfarin and warfarin sodium and warfarin potassium of improved purity.

We claim:

1. In the process of preparing an alkali metal derivative of warfarin selected from the group consisting of warfarin sodium and warfarin potassium, by reacting an aqueous alkali metal hydroxide solution with an aqueous slurry of warfarin containing excess warfarin, the improvement which consists in slowly adding an aqueous alkali metal hydroxide solution, selected from the group consisting of sodium hydroxide and potassium hydroxide solutions, with agitation to a slurry of warfarin containing excess warfarin in water containing about 10% by volume of acetone.

2. The process of claim 1 where the reaction mixture is treated with activated decolorizing charcoal, filtered to remove insoluble material and the resulting clear solution is concentrated and dried to recover the alkali metal derivative of warfarin.

3. The process of claim 1 where the reaction mixture is treated with activated decolorizing charcoal, filtered to remove insoluble material and the resulting clear solution is acidified to recover free warfarin as a precipitate.

4. In the process of preparing warfarin sodium, the improvement which consists in reacting an aqueous solution of sodium hydroxide with an aqueous-acetone slurry of warfarin containing excess warfarin and about 10% by volume of acetone.

5. In the process of preparing warfarin potassium, the improvement which consists in reacting an aqueous solution of potassium hydroxide with an aqueous slurry of warfarin containing excess warfarin and about 10% by volume of acetone.

References Cited by the Examiner

UNITED STATES PATENTS 2,666,064  1/54  Starr et al. _____ 260—343.2
2,752,360  6/56  Starr et al. _____ 260—343.2

IRVING MARCUS, *Primary Examiner.*